T. J. DUFFY.
AUTOMOBILE HEADLIGHT.
APPLICATION FILED JUNE 16, 1917.
1,274,018.
Patented July 30, 1918.
2 SHEETS—SHEET 2.
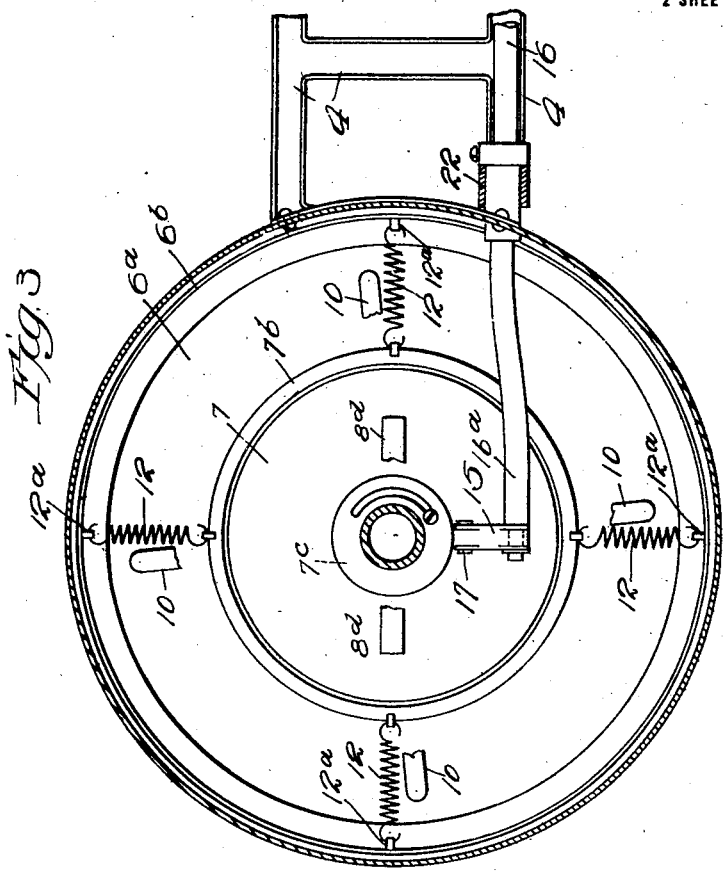
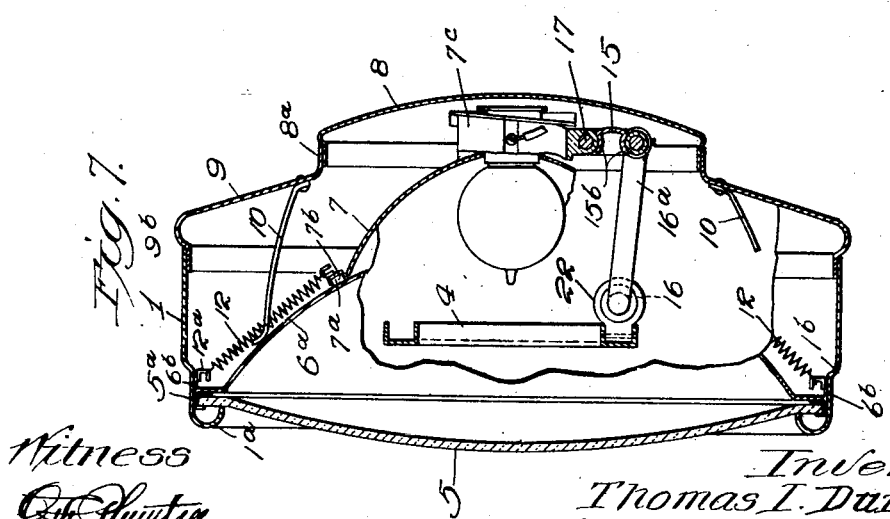
Witness
Inventor
Thomas J. Duffy
by Burton & Burton
his Attys

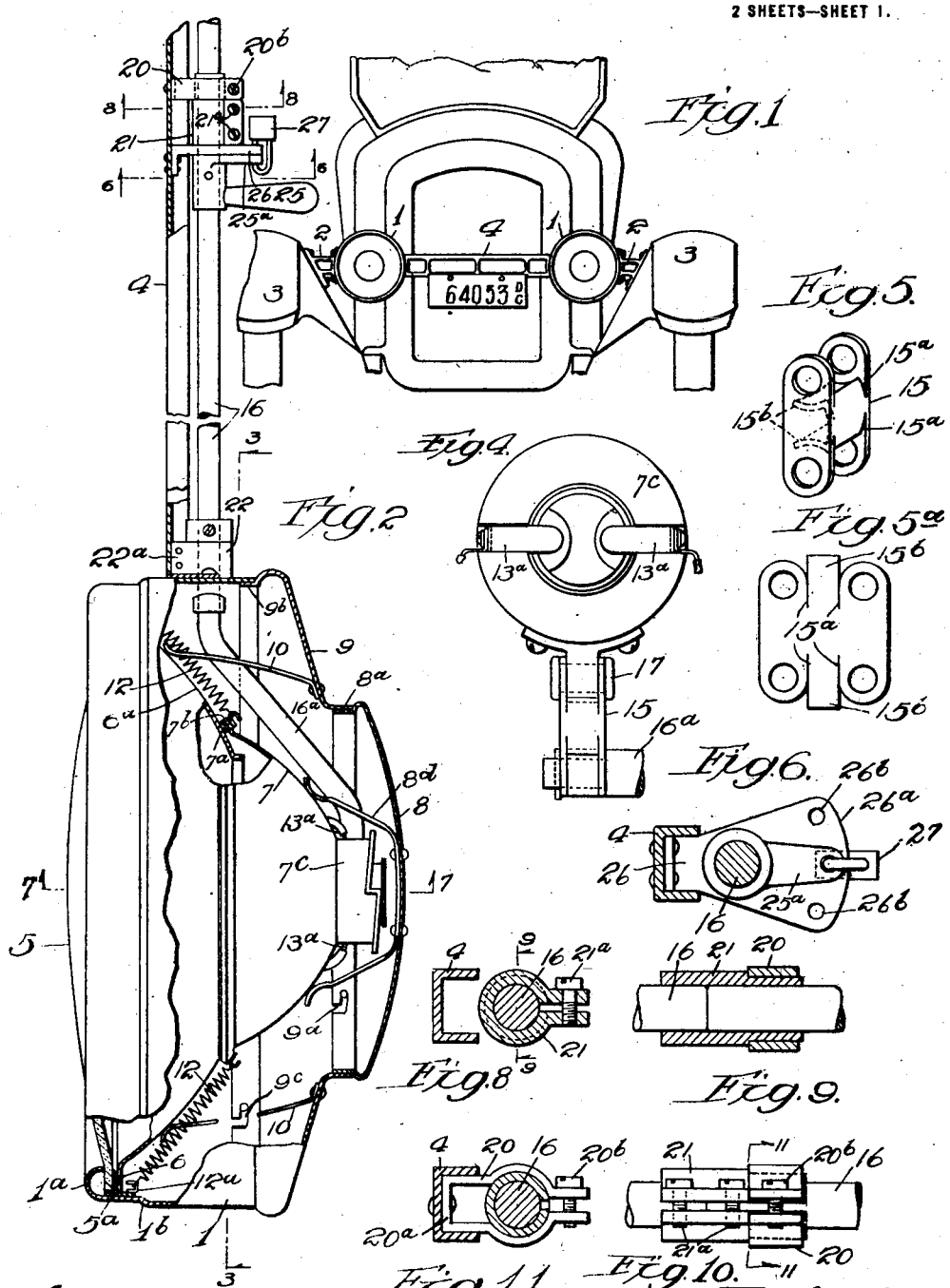
T. J. DUFFY.
AUTOMOBILE HEADLIGHT.
APPLICATION FILED JUNE 16, 1917.
1,274,018. Patented July 30, 1918.

UNITED STATES PATENT OFFICE.

THOMAS I. DUFFY, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

AUTOMOBILE-HEADLIGHT.

1,274,018.

Specification of Letters Patent. Patented July 30, 1918.

Application filed June 16, 1917. Serial No. 175,229.

*To all whom it may concern:*

Be it known that I, THOMAS I. DUFFY, a citizen of the United States, residing at Chicago, in the county of Cook and the State of Illinois, have invented certain new and useful Improvements in Automobile-Headlights, of which the following is a specification, reference being had to the accompanying drawings, forming a part thereof.

The purpose of this invention is to provide an improved construction of headlight for an automobile, provided with means for adjustment for "aiming" the headlight. It consists in the elements and features of construction shown and described, as indicated in the claims.

In the drawings:

Figure 1 is a front elevation of the forward end portion of an automobile headlight constructed and mounted according to this invention.

Fig. 2 is a partly sectional top plan view of one of the headlights and the operating connections, section being made axially with respect to the reflector through the rear portion of the casing.

Fig. 3 is a section at the line, 3—3, on Fig. 2.

Fig. 4 is a detail rear elevation of the reflector-adjusting connections for aiming the lamp.

Fig. 5 is a perspective view of a pressed metal link in the reflector adjusting connection.

Fig. 5ª is a plan view of a blank for said link.

Fig. 6 is a section at the line, 6—6, on Fig. 2, showing locking means for the adjusting devices.

Fig. 7 is a section at the line, 7—7, on Fig. 2, certain parts being broken away.

Fig. 8 is a detailed section at the line, 8—8, on Fig. 2.

Fig. 9 is a section at the line, 9—9, on Fig. 8.

Fig. 10 is a rear elevation of the shaft coupling.

Fig. 11 is a section at the line, 11—11, on Fig. 10.

The drawings are intended to represent a construction in which two lamps mounted upon opposite sides of the vertical fore-and-aft center of an automobile, are provided with means for "aiming" them,—that is, for directing their reflectors to cause them to illuminate the track at the desired distance ahead of the vehicle. The two lamps are presumed to be constructed, and to have their reflector connections adjusted beyond the control of the user, for causing the beams of the two lamps to meet or intersect at the desired distance forward of the vehicle, but leaving it in the power of the user by means of the connections and adjustments provided and shown, to adjust the reflectors to carry the beam up and down so as to either illuminate the track as described at the distance from the vehicle at which the two beams intersect, or to project their respective beams more nearly in a horizontal direction to cause the approach of the vehicle to be recognized from a longer distance in advance, or to cause the respective beams to strike the track at points nearer the vehicle than that at which they intersect and illuminate the same point of the roadway.

For the purpose of permitting the reflectors to be adjusted to vary the direction of the axes, whether for causing the beams to intersect and determine their point of intersection, which is effected by the horizontal adjustment of the axes, or for the purpose of determining at what point the beam shall strike the roadway, or whether it shall be directed horizontally, and especially for convenience in facility in assembling the several parts, the construction of the lamp casing and its associate lamp-holding and reflector-holding and adjusting members is as follows:

There is provided a main casing member, 1, which is mounted fixedly upon the vehicle frame, the support in the construction shown consisting of a bracket, 2, extending from any conveniently contiguous portion of the frame, as for example, from the mud guard, 3; and the casing may be further supported by means of a transversely-extending skeleton bar, 4, mounted upon the forward side of the radiator, and extending between the two headlights for securing both of them together and to the radiator. The main casing member, 1, is of sheet metal, spun or stamped to form at the forward side an inwardly-turned crystal-stopping flange, 1ª, said casing member being in general of cylindrical form, open at the back more widely than at the front to the extent of the width of said flange, 1ª, in addition to the radial extent of a slight offset or shoulder, 1ᵇ, located a little back of said crystal-stopping flange, 1ª. The crystal, 5, therefore, is designed to be introduced at the back and passed forward into contact with the flange, 1ª, and is provided with an edge-embracing cushioning washer, 5ª, to prevent rattling. Back of the crystal, 5, there is positioned a bezel, 6, which is also introduced at the back and brought forward against the crystal or against the anti-rattling flange, 5ª, said bezel being in effect stopped by the crystal-stopping flange, 1ª,—the crystal intervening. The bezel, 6, is formed with a spheroidal surface at 6ª, upon which is seated the forward edge of the forwardly-concave parabolic reflector, 7, said reflector having preferably its said forward edge provided with a sound-stopping or anti-rattling cushion or lip member, 7ª, which may be a ring of rubber or leather or felt for which a recessed seat, 7ᵇ, is preferably provided for it in the marginal portion of said reflector, 7. The spheroidal form of the surface, 6ª, of the bezel, it will be observed, permits the reflector to be adjusted by sliding over said spheroidal surface in any direction without opening any gaps between the two, the seating of the circular edge of the reflector (with its sound-stopping lip member, 7ª,) seating as perfectly at one position as at another upon said spheroidal surface. The back of the casing consists preferably of two members, 9 and 8, the latter being telescoped within the former, at 8ª, and the two members being connected by a bayonet lock indicated at 9ª. The entire back comprising these two members, 8 and 9, is similarly connected to the main casing member at 9ᵇ, where the margin of the member, 9, telescopes about the rear margin of the main casing member, 1, and the two members are connected together by a bayonet lock as shown at 9ᶜ. From the annular member, 9, of the casing back, spring fingers, 10, 10, extend forward and bear upon the back of the bezel, 6, to press it yieldingly into position in the main casing member. Said bezel, however, is constructed with a reversed terminal flange, 6ᵇ, and being of light sheet metal, this flange is sufficiently yielding and elastic so that it may be constructed to fit snugly within the main casing member and may yet be readily forced into place and retained by the frictional engagement resulting from the reaction of said flange; but the spring fingers, 10, 10, are nevertheless desirable to keep the bezel in place against the displacing tendency of the jolting to which it would be subjected in the travel of the vehicle over rough ground.

The parabolic reflector, 7, is held pressed snugly against the spheroidal surface, 6ª, of the bezel, 6, by spring fingers, 8ᵈ, which project forward from the cap member, 8, of the back of the casing, and bear yieldingly upon the back of the reflector, as seen clearly in Fig. 2. For convenience in assembling and dis-assembling, there may be provided light coil-springs, 12, detachably engaged with the reflector and with the marginal portion of the bezel as seen at 12ª, to hold the reflector lightly in position while making the other connections.

For operating the reflector to shift its axis in its vertical plane to throw the beam either horizontally or down onto the track at varying distances in front of the vehicle, the base or hub, 7ᶜ, of the reflector (which is of insulating material for the purpose of mounting the lamp properly and carrying the electric circuit contact members seen at 13ª, but which are not directly concerned with the present invention) is connected by a short link, 15, with the crank arm, 16ª, of a rock shaft, 16, which extends out through the periphery of the main casing and is mounted for rocking on the bracket, 4, in front of the radiator. The construction of the link, 15, which is shown in detail in Fig. 5, is designed with a view to preventing any rattling at the connections of said link with the reflector base and with the crank wrist respectively, said link being for that purpose formed of sheet metal suitably slit at 15ª and folded as illustrated, the middle portion of the blank between the two lateral portions which are folded to form the lugs, 15ᵇ, for engaging the pivots, viz:—the crank wrist at one end of the link, and the pivot pin, 17, at the other end of the link,—being folded in between the two pivots and adapted to bear upon them yieldingly, the material of the link being light enough to cause these infolded lugs or fingers, 15ᵇ, to re-act elastically in this manner upon the pivots and prevent the link from rattling.

The details of mounting of the rock shaft, 16, in the bar, 4, are seen in Figs. 10 and 11. The clip, 20, is folded for insertion in a rearwardly-facing channel of the bar, 4, as seen at 20ª in Fig. 11, and for being clamped by the screw, 20ᵇ, upon a split-coupling sleeve, 21, which unites the two rock shafts at their proximate ends, as seen in Fig. 9, said coupling being clamped onto the two shafts by clamp screws, 21ª, as seen in Fig. 2. At the outer end of each of the rock shafts a bearing is similarly provided for each by a clip, 22, seated as shown at 22ª in the rearwardly-facing channel mentioned. For operating the rock shaft it is provided with a lever arm, 25, which is conveniently mounted near the coupling, 21. For locking the rock shaft,—permanently as by rivets where the municipal regulations forbid adjustability of the headlight, or releasably, as by a padlock, 27, when such adjustability is permitted,—there is secured to the bar, 4, a clip, 26, through which the rock shaft extends and which has a segment lug, 26ª, provided with a plurality of bolt or rivet holes, 26ᵇ, in the arc of a circle about the axis of the rock shaft, and to the lever arm, 25, of the rock shaft has a lug, a clip, 25ª, swinging alongside the lug, 26ª of the clip, 26, and having an aperture which is adapted to register with any one of the apertures of said segments, so as to be riveted thereto, or to be secured thereto by the pad-lock inserted through the registering apertures.

I claim:—

1. In combination with a main shell having at its forward edge a crystal-stopping flange, a bezel adapted to be entered at the back of the shell and stopped by the flange, said bezel having a spheroidal surface adjacent to its inner circumference; a forwardly-concave reflector, having its forward edge seated upon said spheroidal surface, and a detachable back member having spring fingers bearing upon the back of the reflector.

2. In combination with a main shell having at its forward edge a crystal-stopping flange; a bezel adapted to be entered through the back of said main shell and stopped by the flange, said bezel having a spheroidal surface; an annular back member, detachably engaged with said main shell; a forwardly-concave reflector adapted to be entered through the central opening of said annular-back member, and having its forward edge seated upon said spheroidal surface, and a rear cap member detachably engaged with said annular back member and having spring fingers which bear upon the rear surface of the reflector.

3. In combination with a main shell having at its forward edge a crystal-stopping flange; a bezel adapted to be entered through the back of the shell and stopped by the flange, a forwardly-concave reflector having its forward edge stopped upon the bezel; a rear closure for the main shell detachably engaged therewith, and spring fingers carried by said rear closure bearing upon the rear side of the reflector.

4. In combination with a main shell, open at the rear and having at its forward edge a crystal-stopping flange; a bezel adapted to be entered at the rear of the shell and astopped against the flange; a rear closure for the shell comprising an annular member detachably engaged with the main shell and having spring fingers which project forwardly and bear upon the bezel; a concave reflector adapted to be entered through the central opening of said annular back member, and a cap member for the rear closure detachably engaged with the same annular member and having spring fingers which bear upon the rear of the reflector.

5. In combination with a main shell, open at the rear and having at its forward edge a crystal-stopping flange; a bezel adapted to be entered through the back of the shell and stopped against said flange, and having a spheroidal surface adjacent to its central opening; a closure for the shell comprising an annular back member detachably engaged with the shell and having spring fingers projecting forwardly and bearing upon the bezel; a forwardly-concave reflector adapted to be entered through the central opening of said annular back member, and having its forward edge bearing upon said spheroidal surface of the bezel; means carried by said annular back member for yieldingly holding the reflector pressed against the bezel; and means extending into the shell engaging the reflector to slide it at its forward edge bearing on said spheroidal surface.

6. In combination with a main shell, having its rear side open and having at its forward edge a crystal-stopping flange; a bezel adapted to be entered through the back of the shell and stopped against said flange, said bezel having a rearwardly-convex spheroidal surface; a closure for the back of the shell detachably engaged therewith, having spring fingers extending forwardly and bearing upon the bezel to hold it pressed toward the flange; a concave reflector having its forward edge bearing upon the rearwardly-spheroidal surface of the bezel; yielding means carried by the closure member pressing upon the reflector to press it yieldingly upon the said spheroidal surface, and operating connections extending into the shell, engaging the reflector to slide it upon said surface.

7. In combination with a vehicle, a headlight therefor, comprising a casing member fixedly mounted on the vehicle; a reflector in said casing member mounted adjustably for directing the beam; a rock shaft mounted transversely of the vehicle at the front thereof, extending within the headlight casing, and having within said casing a crank arm and connections therefrom for operating the reflector to adjust it, and means outside said casing and wholly outside of the vehicle for operating and securing said rock shaft.

8. In combination with a vehicle, a pair of headlights at opposite sides of the middle fore-and-aft line thereof, each comprising a casing mounted fixedly upon the vehicle, and a reflector within the casing mounted adjustably therein for directing the light beam; a rock shaft mounted transversely of the vehicle at the front thereof, extending into the headlight casings respectively, and having in each casing a crank arm and connections therefrom for operating the reflector by the rocking of the shaft, and means outside the casing and wholly outside of the vehicle for operating and securing said rock shaft.

In testimony whereof I have hereunto set my hand at Chicago, Illinois, this 29th day of May, 1917.

THOMAS I. DUFFY.